United States Patent [19]

Chon

[11] 4,177,595
[45] Dec. 11, 1979

[54] PORTABLE FISHING ROD HOLDER AND STAND

[76] Inventor: Pyong H. Chon, 921 Citron - #2, Anaheim, Calif. 92805

[21] Appl. No.: 919,673

[22] Filed: Jun. 27, 1978

[51] Int. Cl.² ........................................... A01K 97/10
[52] U.S. Cl. ..................................... 43/21.2; 248/183
[58] Field of Search ..................... 43/54 SR, 55, 21.2; 248/520, 521, 533, 183, 168

[56] References Cited

U.S. PATENT DOCUMENTS

| | | | |
|---|---|---|---|
| 2,184,583 | 12/1939 | Danko | 43/21.2 |
| 2,204,013 | 6/1940 | Gaidos | 248/183 X |
| 2,586,721 | 2/1952 | Rubin | 248/183 |
| 2,694,542 | 11/1954 | Barbakoff | 248/168 |
| 2,835,066 | 5/1958 | Spilker | 43/21.2 |
| 4,043,070 | 8/1977 | Lamothe | 43/21.2 |

Primary Examiner—Nicholas P. Godici
Attorney, Agent, or Firm—W. Britton Moore

[57] ABSTRACT

A portable fishing rod holder and stand including a circular compartmented tray with three spaced depending legs and a sleeved post extending vertically and rotatably at the center thereof. Pivotally and swingably arranged at the upper end of the post is a flat horizontal reel supporting plate having an elongated telescoped supporting pole positioned therein and projecting forwardly therefrom and formed with upwardly extending fishing rod supporting brackets. A rearwardly and upwardly extending bracket on the plate with a spring-pressed clamp receives the handle portion of a fishing rod and, together with the pole clamps, retains the rod in generally horizontal fishing position when a fish is caught on the hooked line thereof. The reel supporting plate has a flat hinged leaf portion thereon for upward angular movement to engage with and support an enlarged and heavy fishing reel thereabove, and the pivotal support for the horizontal plate has a rearwardly projecting rod handle for angularly adjusting the plate and fishing rod.

9 Claims, 4 Drawing Figures

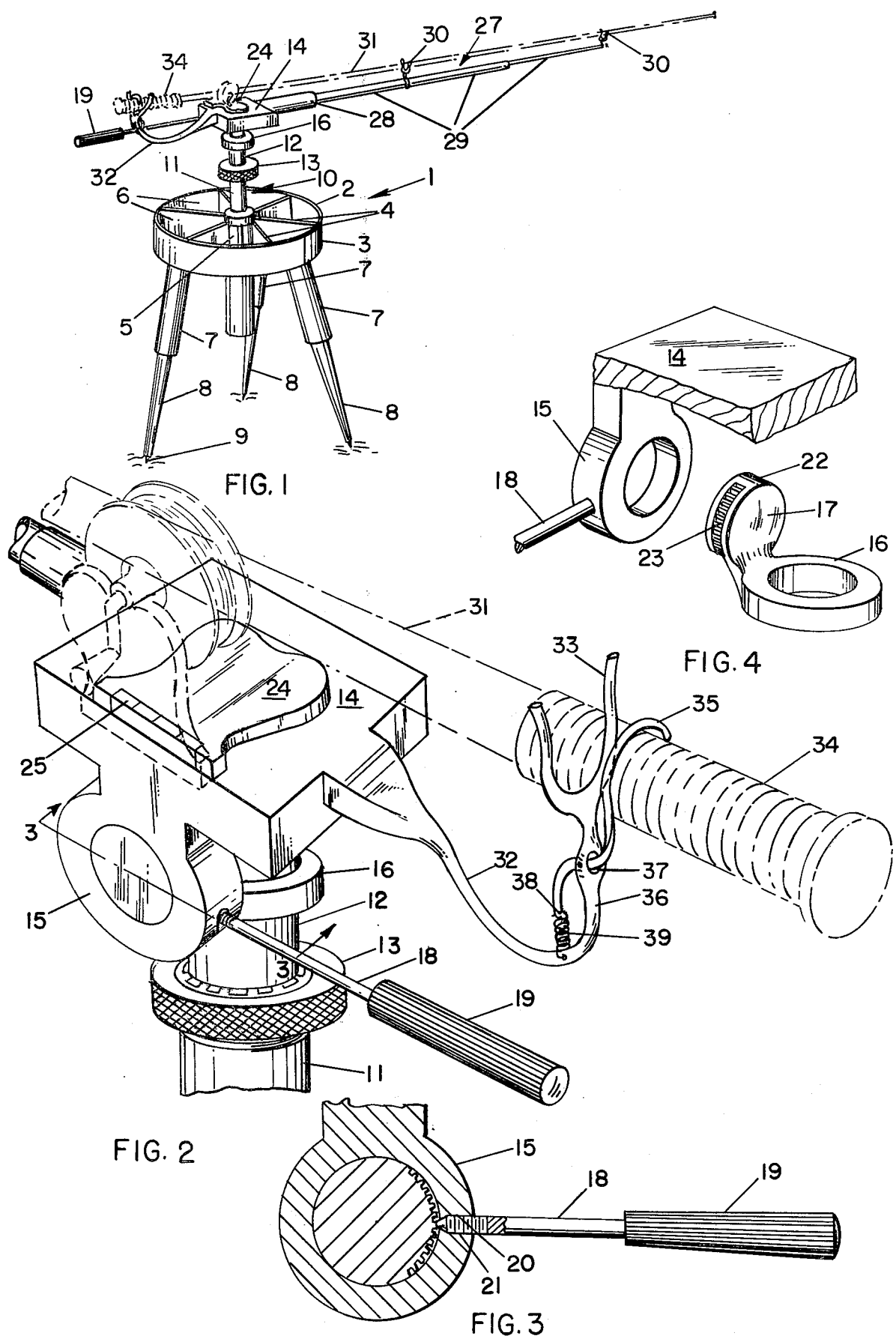

PORTABLE FISHING ROD HOLDER AND STAND

This invention relates to a portable fishing rod holder and stand for supporting a rod in fishing position and having means for rotatably and angularly adjusting the holder and rod.

While many fishing rod holders have been proposed for maintaining a rod in fishing position, such as those of U.S. patents to Gnazy U.S. Pat. No. 2,713,741, Long U.S. Pat. No. 3,555,716, Akamu U.S. Pat. No. 3,747,881, and Whitfield U.S. Pat. No. 3,835,568, none of these devices have been provided with means for efficiently and adjustably supporting the rod angularly and arcuately, while the reel portion thereof is securely supported in reeling position. In addition, such devices have been devoid of means for storing necessary fishing paraphernalia.

The principal object of the present invention is to provide a portable fishing rod holder and stand having supporting legs, a circular compartmented tray for fishing paraphernalia with an upright pole thereon for angularly and arcuately supporting a flat horizontal reel plate from which a telescopically arranged forwardly extending pole with rod supporting brackets projects, with a bracket projecting rearwardly and upwardly from the reel plate for supporting the handle of a fishing rod whereby the latter is retained in preselected fishing position.

Another object is the provision of a fishing rod holder and stand wherein the supporting post thereof is sleeved for vertical and arcuate adjustment, and the reel plate supported thereby is arranged for angular adjustment thereon.

A further object is to provide handle means for locking the reel plate and rod supporting pole and brackets in a preselected angular position.

Still another object is the provision of a reduced leaf portion hingedly mounted on the reel plate for pivotal movement to a vertical position for engaging with and supporting enlarged and heavy fishing reels above the reel plate.

A still further object is to provide a circular tray with a plurality of generally V-shaped open compartments for storing hooks, leaders, line, and assorted fishing paraphernalia therein.

Another object is the provision of a U-shaped supporting bracket extending rearwardly and upwardly from the flat reel plate and having a forked upper end for receiving a fishing rod handle therein with a spring-pressed clamp associated therewith for engaging over the handle and retaining the same therein.

These and other objects and advantages will be apparent as the specification is considered with the accompanying drawings, wherein FIG. 1 is a perspective view of the portable fishing rod holder and stand showing the hinged reel leaf in collapsed position on the flat reel plate and a rod reel positioned thereon and supported thereby;

FIG. 2 is a perspective view of the flat reel plate, hinged leaf portion thereon, handle supporting bracket and clamp, and the handle rod for angularly adjusting the plate and associated elements, FIG. 3 is a section on the line 3—3 of FIG. 2; and FIG. 4 is an exploded view, partly in section, of the flat reel supporting plate, depending circular bearing with control rod projecting therefrom, and the upstanding circular ratcheted boss on a circular bearing mounted on the upper end of the supporting post received in the first bearing.

Referring more particularly to the drawings, wherein similar reference characters designate like parts throughout the several views, numeral 1 generally indicates a fishing rod holder and stand including a circular tray 2 with a flat bottom wall, not shown, an upstanding side wall 3 from which a series of dividing walls 4 extend to a central tubular hub 5 so as to provide open compartments 6 for storage of various fishing paraphernalia, such as, hooks, leaders, line, etc., not shown. Depending downwardly at right angles from and suitably removably attached to the underside of tray 2 are tubular leg sockets 7 having legs 8 with pointed lower ends 9 suitably sleeved and retained in the sockets for vertical adjustment therein. It will be apparent that the sockets 7 may be removably connected to the tray, such as by threading the upper ends thereof for reception in circular sockets in or on the underside of the tray, which is considered obvious without being illustrated herein. This will permit the sockets 7 and legs sleeved therein to be removed when it is desired to dismantle the stand for transportation and storage purposes, in an obvious manner.

The central hub 5 of circular tray 2 is tubular and may project below the bottom tray wall, as shown in FIG. 1, and is closed at its lower end to form a socket in which an upstanding post 10 is suitably fixedly sleeved. Post 10 may include an outer tube 11 (FIG. 2) within which an inner post 12 may be sleeved. Inner post 12 may be suitably fixedly and rotatably retained in tube 11, such as, by providing the tapered and split upper end of tube 11 with exterior threads, not shown, which threadedly engage with an interiorly threaded knurled ring 13 thereon and forming a well known collet arrangement. Thus, when the ring 13 is rotated in one direction it will exert a squeezing action on the split and tapered upper end of tube 11 and draw it into clamping engagement with the lower end of inner post 12 so as to prevent relative movement therebetween, in an obvious manner. On the otherhand, when ring 13 is rotated in the opposing direction, the split upper end of tube 11 will expand and loosen its grip on inner post 11 thereby permitting relative rotation therebetween. This is a well known construction which does not require specific illustration.

A flat rectangular reel supporting plate 14 is pivotally arranged on the upper end of inner post 12 by a ring-like member 15, formed on and depending from the underside of plate 14, at one side thereof. Ring 15 is interconnected to and receives a circular boss 17, formed on and projecting upwardly from a horizontally disposed ring 16, fixedly sleeved over the upper end of post 13. An elongated rod 18 with a control handle 19 on the outer end thereof projects through an opening 20 in ring 15, and the inner end is pointed and threaded, as at 21, to engage the internally threaded opening 20. The annulus 22 of boss 17 is formed with a series of transverse grooves or indentations 23, extending part way of the circumference thereof. Thus, when boss 17 is fitted within ring 15, the handled rod 19 may be moved vertically to pivotally adjust ring 15 and the reel supporting plate 14 relative to boss 17 and post 12, or the rod 19 may be rotated so that the pointed inner end 21 thereof will enter one of the grooves 23 and lock the ring and boss thereat and against further relative movement, for a purpose presently to be described.

Hingedly mounted, as at 25, on the upper face of the reel supporting plate 14, at one side thereof, is a flat leaf member 24, which, in its collapsed full line positions of FIGS. 1 and 2, flatly engages plate 14, but when pivoted upwardly approximately 110° degrees will project generally vertically relative thereto. The free end of leaf 24 is curved inwardly to form a shallow recess 26 for engagement with an enlarged and heavy fishing reel, not shown, when such and a rod are mounted on the stand, as hereinafter will be described.

The tubular base section 28 of an elongated supporting pole 27, including reduced and suitably telescoping sections 29 sleeved within each other, is sleevably supported within a bore, not shown, formed and projecting inwardly of a side edge of reel supporting plate 14, so as to project forwardly therefrom. Upwardly extending U-shaped brackets 30 are spacedly formed on sections 29 and serve to receive a fishing rod 31 therein, as shown in FIG. 1. Formed on and projecting rearwardly and upwardly from an opposed side edge of plate 14 is an upwardly curved bracket 32 with a U-shaped support 33 at its upper end which functions to receive the handle portion 34 of the fishing rod 31 therein so that the rod will be generally horizontally supported parallel to and above the supporting pole 27 and reel plate 14 by brackets 30 and 32. A hook-like clamp 35 extends through a slot 37 in an upstanding leg 36 of bracket 32 and is pivoted therein, and the lower end 38 of clamp 35 is connected to bracket 32 by a spring 39. As will be evident from FIG. 2, clamp 35 will fit over handle 34 and exert downward pressure thereagainst to prevent the handle from being dislodged from bracket 32 when a downward tug is exerted on the forward end of the fishing rod by a fish hooked on the line thereof. It will, of course, be apparent that upward manual pivotal movement of clamp 35 will free the rod for removal from its supporting brackets.

When a light fishing rod and reel is mounted on the stand, the leaf member 24 will be in collapsed position so that the reel will rest on and be supported by the leaf and flat plate 24. On the otherhand, when employing a larger rod and relatively heavy reel, the leaf member will be elevated for supporting the reel above the plate so as to facilitate reeling action thereof. In such an instance, the plate 24 will be free of an obstruction and may serve as a cutting board for bait, or other uses.

From the foregoing, it will be noted that selected angular positioning of the supporting pole and fishing rod may be readily effected by so rotating control rod 18 that its pointed end is withdrawn from the boss grooves 23, at which time vertical movement of the rod in the appropriate direction will angularly adjust the pole and fishing rod. Vertical and rotational adjustment of the device may be accomplished by loosening the knurled ring 13 and its squeezing action on the inner supporting post 12 so that the post may be moved vertically or rotationally. The pointed legs 8 may be pushed into the ground or other surface and will stabilize and support the stand securely.

The stand may be readily dismantled for storage or transportation by removing the upstanding post from its socket, after which the telescoped supporting pole 27 may be collapsed and removed from reel plate 14, and the latter removed from its supporting boss. The supporting leg sockets and legs may then be removed from the circular tray and the various components compactly stored.

While a preferred embodiment of fishing rod holder and stand has been shown and described, it is to be understood that various changes and improvements may be made therein without departing from the scope and spirit of the appended claims.

What I claim is:

1. A fishing rod holder and stand for supporting in fishing position a fishing rod and reel comprising a circular tray with an upstanding side wall and a plurality of open compartments therein, removable spaced legs depending from said tray, a centrally disposed tubular hub in said tray having an upright tubular post removable therein, an inner post member sleeved within said post, adjusting means on said tubular post for preventing relative movement therebetween, a flat generally horizontal reel supporting plate formed with downwardly depending ring means, and circular boss means on said inner post member interfitting in said ring means, handle rod means projecting from said ring means for relatively and tiltably adjusting said ring and boss means, an elongated supporting pole mounted in and projecting forwardly from said flat plate, a rearwardly and upwardly extending U-shaped bracket means on said plate for receiving and supporting the handle end of a fishing rod, and spaced brackets on said elongated supporting pole for receiving and supporting the forward end of the fishing rod whereby the latter is supported in fishing position with the reel thereof supported by said reel supporting plate.

2. A fishing rod holder and stand according to claim 1, wherein said compartments are V-shaped and extend circumferentially thereof.

3. A fishing rod holder and stand according to claim 1, wherein the adjusting means on said tubular post includes slotting and exteriorly threading the upper end of said post, an interiorly threaded and exteriorly knurled ring means arranged on said upper end, whereby rotation of said ring means squeezes said post against said inner post and prevents relative movement therebetween.

4. A fishing rod holder and stand according to claim 1, wherein flat leaf means is hingedly attached to said flat horizontal reel supporting plate and is pivotal vertically relative thereto for engaging with and supporting a large and heavy fishing reel.

5. A fishing rod holder and stand according to claim 4, wherein said leaf means is hinged at one side to one side of said flat plate and is hinged upwardly, and an inner edge of said leaf means having a shallow curved recess for receiving and supporting the reel.

6. A fishing rod holder and stand according to claim 1, wherein said depending ring means is formed on and extends downwardly from said reel supporting plate at one side thereof, and said circular boss means interfitting therewith is a flat plate and formed on and projects upwardly from ring means on said inner post member.

7. A fishing rod holder and stand according to claim 6, wherein said boss means is multi-grooved on its annulus, and said handle rod means on said ring means projects therethrough and is pointed at its inner end, said pointed end interfitting a groove in said boss means for interlocking said ring and boss.

8. A fishing rod holder and stand according to claim 7, wherein said handle rod means is threaded into said ring means for movement into and out of engagement with a groove in said boss means whereby when rotated relative to said ring means the latter is either locked relative to said boss means or tiltable relative thereto for pivotally adjusting said reel supporting plate and associated parts.

9. A fishing rod holder and stand according to claim 1, wherein said rearwardly and upwardly extending U-shaped member on said reel plate has spring-pressed hook-shaped means pivoted thereto and extending upwardly and downwardly therefrom for over-engaging the handle of said fishing rod and retaining it in said U-shaped member.

* * * * *